United States Patent [19]
Honerkamp et al.

[11] 3,867,112
[45] Feb. 18, 1975

[54] RECONCENTRATING SOLUTE-RICH LIQUID ABSORBENT

[75] Inventors: Joseph D. Honerkamp; Paul M. Tournoux, both of Oklahoma City, Okla.

[73] Assignee: Black, Sivalls & Bryson, Inc., Houston, Tex.

[22] Filed: Mar. 26, 1973

[21] Appl. No.: 344,840

[52] U.S. Cl. ............................ 55/32, 55/84, 55/89, 55/171, 55/175, 159/31
[51] Int. Cl. ............................................ B01d 53/14
[58] Field of Search ......... 55/32, 45, 160, 171, 172, 55/173, 174, 175, 176, 177; 159/16, 31

[56] References Cited
UNITED STATES PATENTS

| | | | |
|---|---|---|---|
| 3,105,748 | 10/1963 | Stahl | 55/32 |
| 3,492,787 | 2/1970 | McMinn | 55/31 |
| 3,616,598 | 11/1971 | Foral, Jr. | 55/32 |

Primary Examiner—Charles N. Hart
Assistant Examiner—Ferris H. Lander
Attorney, Agent, or Firm—Laney, Dougherty, Hessin & Fish

[57] ABSTRACT

The present invention relates to methods and systems for continuously reconcentrating a stream of solute-rich liquid absorbent. The rich liquid absorbent is heated to vaporize a portion of the solute contained therein and the resulting stream of partially reconcentrated liquid absorbent is intimately contacted with a stream of stripping gas so that additional solute is vaporized and the liquid absorbent is further reconcentrated. At least a portion of the solute contained in the mixture of stripping gas and vaporized solute formed is removed and the resulting stream of relatively solute free stripping gas is recycled into intimate contact with the partially reconcentrated liquid absorbent.

18 Claims, 2 Drawing Figures

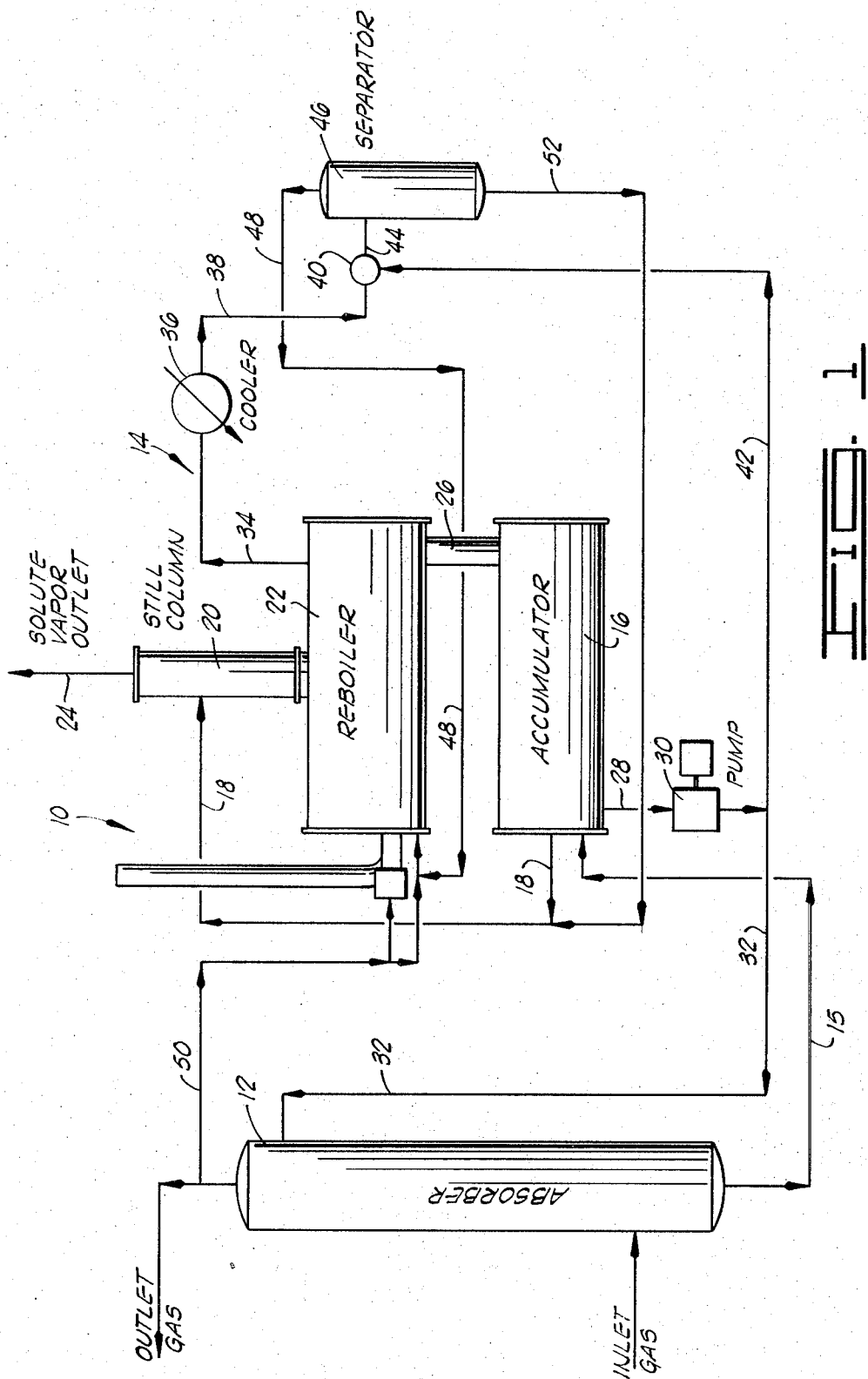

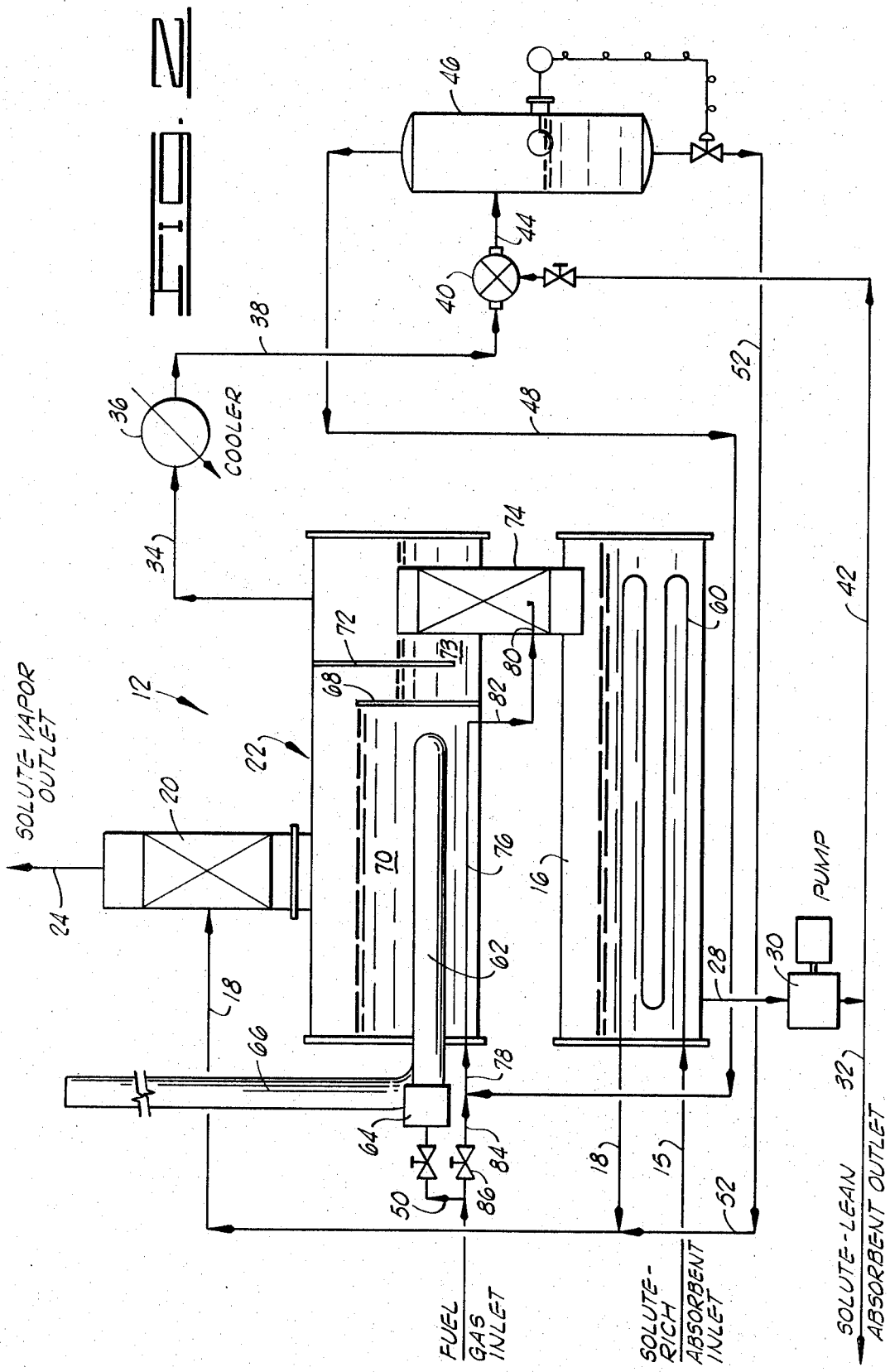

RECONCENTRATING SOLUTE-RICH LIQUID ABSORBENT

BACKGROUND OF THE INVENTION

1. Field of the Invention

The present invention relates generally to methods and systems for reconcentrating liquid absorbent, and more particularly, but not by way of limitation, to methods and systems for reconcentrating a stream of solute-rich liquid absorbent wherein the solute is vaporized through the application of heat and stripping gas.

2. Description of the Prior Art

Many various methods and systems for reconcentrating liquid absorbent solutions have been developed. For example, in dehydrating gas streams containing water vapor, the gas stream is commonly contacted with a lean liquid absorbent such as an aqueous solution of glycol. Water vapor contained in the gas stream is absorbed by the glycol solution and the resulting water-rich glycol solution is introduced into a reconcentrator. While flowing through the reconcentrator, a major portion of the water contained in the rich glycol solution is vaporized and separated therefrom to produce a reconcentrated or lean glycol solution for recirculation into contact with the gas stream. In drying gas streams such as natural gas, the liquid absorbent most commonly used is an aqueous solution of triethylene glycol. However, aqueous solutions of ethylene glycol, diethylene glycol and tetraethylene glycol as well as other liquid absorbents, may also be used.

Liquid absorbents are utilized for removing a variety of absorbable components contained in both gas and liquid streams. In the reconcentration of the resulting rich liquid absorbent streams, particularly glycol absorbent solutions, two types of reconcentrating systems have been commonly used heretofore. In the first type, the solute-rich liquid absorbent is reconcentrated by the application of heat alone. That is, the stream of rich liquid absorbent is introduced into a reboiler wherein it is heated to vaporize at least a portion of the solute contained therein. The vaporized solute is removed from the reboiler and the reconcentrated lean liquid absorbent produced is cooled and reused for absorbing additional solute.

Due to the fact that some liquid absorbents are temperature-sensitive, reconcentration of such liquid absorbents through the application of heat alone is unsatisfactory. For example, glycol absorbent solutions decompose at elevated temperatures and reconcentration thereof by heat alone can be accomplished only to a concentration of approximately 99% by weight without excessive decomposition of the glycol. In order to achieve higher concentrations, a second type of liquid absorbent reconcentrating system has been developed and used heretofore for reconcentrating temperature sensitive absorbents such as glycol solutions. This type of system includes a heated reboiler in which heat is applied to the solute-rich liquid absorbent to partially reconcentrate it. The partially reconcentrated liquid absorbent is then intimately contacted with a stream of stripping gas so that additional solute is stripped therefrom and the liquid absorbent is further reconcentrated. The vaporized solute and stripping gas are withdrawn from the reconcentrator system and generally are released to the atmosphere. In this type of system, high concentration lean liquid absorbent may be obtained without decomposition of the liquid absorbent occurring. This type of system and the method carried out in the system are described in detail in U.S. Pat. No. 3,105,748 dated Oct. 1, 1963.

By the present invention, an improved method and system for reconcentrating solute-rich liquid absorbent is provided wherein the liquid absorbent is heated and then contacted with stripping gas, but the stripping gas is continuously recycled within the system.

SUMMARY OF THE INVENTION

The present invention is directed to a method of reconcentrating a stream of solute-rich liquid absorbent wherein the stream of rich liquid absorbent is heated to vaporize a portion of the solute contained therein, the vaporized solute is separated from the liquid absorbent, and the resultant stream of partially reconcentrated liquid absorbent is intimately contacted with a stream of stripping gas so that additional solute is vaporized and stripped therefrom and the stream of liquid absorbent is further reconcentrated. The mixture of stripping gas and vaporized solute produced is separated from the reconcentrated liquid absorbent and the reconcentrated liquid absorbent is withdrawn. A portion of the solute contained in the mixture of stripping gas and solute is removed therefrom, and the resulting stream of relatively solute-free stripping gas is recycled into intimate contact with the partially reconcentrated liquid absorbent. Systems for carrying out the method are also provided by the present invention.

It is, therefore, a general object of the present invention to provide methods and systems for reconcentrating a stream of solute-rich liquid absorbent.

A further object of the present invention is the provision of methods and systems for reconcentrating a stream of liquid absorbent by contacting the liquid absorbent with stripping gas wherein the stripping gas is prevented from entering the atmosphere and causing the pollution thereof.

Yet a further object of the present invention is the provision of methods and systems for reconcentrating a stream of solute-rich liquid absorbent wherein the liquid absorbent is first partially reconcentrated by the application of heat and then further reconcentrated by contact with a stream of recycled stripping gas thereby reducing the consumption of fuel and/or stripping gas as compared to prior art systems.

Other and further objects, features and advantages of the present invention will be apparent from the following detailed description of presently preferred embodiments, given for the purpose of disclosure when taken in conjunction with the accompanying drawings.

BRIEF DESCRIPTION OF THE DRAWINGS

FIG. 1 is a diagrammatic view of a system for removing absorbable components from a gas stream which includes a system of the present invention for reconcentrating liquid absorbent, and FIG. 2 is a detailed diagrammatic illustration of the system for reconcentrating liquid absorbent of FIG. 1.

DESCRIPTION OF PREFERRED EMBODIMENTS

Referring to FIG. 1, a system for removing absorbable components from a gas stream, for example, water vapor from a natural gas stream, is illustrated and generally designated by the numeral 10. The system 10 includes an absorber 12 and a liquid absorbent reconcentrator system of the present invention generally designated by the numeral 14. The absorber 12 is of a conventional design and functions to bring about intimate contact between a stream of liquid absorbent and a gas stream. The absorber 12 can include a plurality of conventional vapor-liquid contact trays, or it can contain conventional packing material or other means for bringing about intimate contact between liquid absorbent passing downwardly therein and gas passing upwardly therein.

Solute-rich liquid absorbent accumulates in the bottom portion of the absorber 12 and is removed therefrom by way of a conduit 15. As will be understood by those skilled in the art, the term "rich liquid absorbent" is used herein to mean liquid absorbent which is relatively loaded with one or more absorbed components. Absorbed components are collectively referred to herein as "solute". Rich liquid absorbent which has been reconcentrated, i.e., a portion of the solute removed therefrom, is referred to herein as "lean" liquid absorbent.

Referring still to FIG. 1, the rich liquid absorbent withdrawn from the absorber 12 by way of the conduit 15 passes through a heat exchanger (not shown) disposed within a liquid absorbent accumulator 16, both of which will be described in detail hereinbelow, and then flows by way of a conduit 18 to a conventional still column 20 attached to a reboiler 22. While flowing through the still column 20 and reboiler 22, the rich liquid absorbent is heated so that at least a portion of the solute contained therein is vaporized and removed by way of a conduit 24 attached to the still column 20.

A stripping gas column 26 which will be described in detail hereinbelow is attached to the reboiler 22 and to the accumulator 16. While passing through the stripping gas column 26, partially reconcentrated liquid absorbent from the reboiler 22 is contacted with stripping gas so that additional solute is vaporized and stripped therefrom and the stream of liquid absorbent is further reconcentrated. The resulting reconcentrated or lean liquid absorbent accumulates in the accumulator 16 wherein it is cooled by exchange of heat with the rich liquid absorbent stream.

A continuous stream of lean liquid absorbent is withdrawn from the accumulator 16 by way of a conduit 28 which is connected to a conventional pump 30. The discharge of the pump 30 is connected to a conduit 32 which is in turn connected to the lean liquid absorbent inlet connection of the absorber 12.

The mixture of stripping gas and vaporized solute produced in the stripping gas column 26 flows therefrom, through the reboiler 22 and into a conduit 34 attached to the reboiler 22. The conduit 34 leads the mixture to a gas cooler 36 which may be any conventional gas cooler utilizing water, air or other form of cooling media. The mixture of stripping gas and solute exiting the cooler 36 is led by a conduit 38 to a liquid absorbent contactor 40. A conduit 42 is connected to the contactor 40 and to the conduit 32 downstream of the pump 30. The conduit 42 leads a stream of lean liquid absorbent from the conduit 32 to the contactor 40. As will be described in greater detail hereinbelow, the contactor 40 may take a variety of forms, but functions to bring about intimate contact between the mixture of stripping gas and solute and the stream of liquid absorbent flowing into the contactor 40 so that at least a portion of the solute is absorbed by the liquid absorbent.

The contactor 40 may be a liquid seal compressor using the liquid absorbent as the sealing fluid. In this case the compressor serves the dual purpose of providing gas liquid contact and compression for gas recirculation. If a different type contactor is used some other source of compression is required for gas recirculation. The resulting mixture of stripping gas and rich liquid absorbent flows by way of a conduit 44 connected to the contactor 40 to the inlet of a conventional gas liquid separator 46. While flowing through the separator 46, the stripping gas is separated from the rich liquid absorbent and the relatively solute-free stripping gas exits the separator 46 by way of a conduit 48 attached thereto. The conduit 48 leads the stripping gas to the stripping gas inlet of the stripping gas column 26.

As illustrated in FIG. 1, a portion of the gas stream exiting the absorber 10 may be routed by way of a conduit 50 to the reboiler 22 wherein it is utilized as fuel. A portion of the gas stream passing through the conduit 50 may also be utilized as a stripping gas make-up to the system 12. Rich liquid absorbent accumulating in the separator 46 is removed therefrom by way of a conduit 52 which is attached to the previously described conduit 18.

Referring now to FIG. 2, the system 12 for reconcentrating liquid absorbent is illustrated in greater detail. The rich liquid absorbent enters the system 12 by way of the conduit 15 in the manner described above and flows through a heat exchange coil 60 disposed within the accumulator 16 below the level of hot reconcentrated liquid absorbent maintained therein. From the coil 16 the stream of rich liquid absorbent passes by way of the conduit 18 into the still column 20 and reboiler 22. The reboiler 22 includes a conventional firebox 62 disposed in the forward portion thereof. A conventional fuel gas burner 64 is attached to one end of the firebox 62 and a conventional stack 66 is attached to the other end thereof. Fuel is provided to the burner 64 by way of the previously described conduit 50 which is attached thereto.

The reboiler 22 includes a transverse baffle 68 disposed in the lower portion thereof and positioned rearwardly of the firebox 62 so that a body of liquid absorbent 70 is maintained in the forward portion of the reboiler 22 at a level above the firebox 62. A second transverse baffle 72 is disposed within the upper portion of the reboiler 22 positioned a distance rearwardly of the baffle 68 so that liquid absorbent flowing over the top of the baffle 68 is caused to flow under the baffle 72 thereby preventing vapor communication from the rearward portion to the forward portion of the reboiler 22 and vice versa. Other arrangements of baffles, weirs, standpipes, or other devices may also be used to prevent vapor communication between the forward and rearward portions of the reboiler 22. A stripping gas column 74 having conventional packing material or other means disposed therein for bringing about intimate contact between liquid passing downwardly and gas passing upwardly therein is connected to the reboiler 22 at the rearward end thereof. Preferably, the stripping gas column extends vertically upwardly a distance within the reboiler 22 as shown in FIG. 2 so that a body of liquid absorbent 73 is maintained in the reboiler 22 rearwardly of the baffle 72. The lower end of the stripping gas column 74 is connected to the top of the accumulator 16 in a manner such that liquid absorbent is caused to flow from the reboiler 22 through the stripping gas column 74 and into the accumulator 16. A conventional preheat coil 76 is disposed within the body of liquid absorbent 70 contained within the reboiler 22. The inlet of the coil 76 is connected to a conduit 78 and the outlet thereof is connected to a conduit 82 which is in turn connected to a stripping gas inlet connection 80 disposed in the stripping gas column 74.

In operation of the system 12, the stream of rich liquid absorbent enters the system by way of the conduit 15, passes through the heat exchange coil 60 wherein the liquid absorbent is preheated and then flows by way of the conduit 18 to the still column 20. The still column 20 is conventional in design and contains packing material or trays for bringing about intimate contact between the stream of rich liquid absorbent passing downwardly therein and absorbent and solute vapors passing upwardly therein. This contact between the relatively cool rich liquid absorbent and the rising vapors functions to bring about the condensation of vaporized liquid absorbent which would otherwise escape the reboiler 22. The solute vapors generated in the reboiler 22 flow through the still column 20 and exit by way of the conduit 24 attached thereto. Heat generated by the burner 64 is transferred from combustion gases passing through the firebox 62 to the body of liquid absorbent 70 contained within the reboiler 22 causing a portion of the solute contained in the liquid absorbent to be vaporized. A portion of the liquid absorbent may also be vaporized and the mixture of vaporized solute and liquid absorbent separates from the partially reconcentrated liquid absorbent and passes upwardly through the still column 20. As described above, the vaporized liquid absorbent is condensed by the downwardly flowing relatively cool rich liquid absorbent in the still column 20, but the vaporized solute passes upwardly through the still column 20 and is removed therefrom. As will be understood by those skilled in the art, when the liquid absorbent is utilized for removing desired absorbable components from a gas stream, other components of the gas stream in addition to the desired components may be absorbed. These components are vaporized in the reboiler 22 and are withdrawn therefrom by way of the still column 20 and the conduit 24.

The partially reconcentrated liquid absorbent produced in the forward portion of the reboiler 22 flows from the body 70 thereof over the baffle 68 under the baffle 72 and into the body of liquid absorbent 73. From the body 73 thereof, the partially reconcentrated liquid absorbent spills over the top of the stripping gas column 74 and passes downwardly through the vapor liquid contact media contained therein. As the partially reconcentrated liquid absorbent passes downwardly in the column 74, stripping gas entering the column 74 by way of the inlet connection 80 passes upwardly intimately contacting the liquid absorbent. The stripping gas causes additional solute to be vaporized and stripped from the liquid absorbent further reconcentrating it. The thus reconcentrated lean liquid absorbent passes into the accumulator 16 wherein it exchanges heat with the stream of rich liquid absorbent passing through the heating coil 60. As described above, a stream of the lean liquid absorbent from the accumulator 60 is withdrawn through the conduit 28 by the pump 30 and pumped through the conduit 32 to the absorber 12 (FIG. 1) or other area of use.

The stripping gas and solute vapors exiting the top portion of the stripping gas column 74 pass upwardly through the rearward area of the reboiler 22 and into the conduit 34. As will be understood, the lower edge of the baffle 72 is immersed in the body of liquid absorbent 73 so that the stripping gas and vaporized solute exiting the stripping gas column 74 are prevented from passing into the forward portion of the reboiler 22. The mixture of stripping gas and solute flows to the cooler 36 by way of the conduit 34 wherein the mixture is cooled and then to the contactor 40 by way of the conduit 38. As described above, a stream of lean liquid absorbent is led to the contactor 40 by the conduit 42 and the mixture of stripping gas and solute is intimately contacted by the liquid absorbent as it passes through the contactor 40 so that at least a portion of the solute is absorbed by the liquid absorbent.

Since the efficiency of the absorption process is greatly increased at lower temperatures, the cooler 36 is utilized to cool the gas mixture prior to when it is contacted by the stream of lean liquid absorbent in the contactor 40. As will be understood by those skilled in the art, a great variety of methods and apparatus may be utilized to being about the desired contact between the mixture of stripping gas and the stream of lean absorbent, and the cooler 36 may or may not be utilized to increase the efficiency of the process. In a preferred form of the invention, however, the cooler 36 is utilized and the contactor 40 is a pump powered by the pressure energy of the stream of lean liquid absorbent introduced thereto by way of the conduit 42. Such liquid seal pumping devices are commercially available and can be used to achieve the dual function of pumping the mixture of stripping gas and solute through the system 12 and bringing about the intimate contact thereof with the stream of the lean liquid absorbent.

The resulting relatively solute-free stripping gas and rich liquid absorbent from the contactor or pump 40 flows by way of the conduit 44 into the separator 46. As described previously, the stripping gas is separated from the rich liquid absorbent in the separator 46 and flows by way of the conduit 48 to the conduit 78, through the stripping gas preheat coil 76, the conduit 82 and into the stripping gas column 74.

Thus, it may be seen that by the present invention a stream of stripping gas is continuously recycled into contact with the partially reconcentrated liquid absorbent to further reconcentrate it thereby obviating the requirement for a continuous supply of stripping gas and providing an efficient and economical method and system for continuously reconcentrating a stream of rich liquid absorbent.

In order to present a clear understanding of the methods and systems of the present invention, the following example is given:

Example

In order to dehydrate a 100 million standard cubic foot per day stream of natural gas saturated with water at inlet conditions of 500 psia and 100°F (105 pounds of water per mmscf) to an outlet water dew point of 10°F utilizing the system 10 and a triethylene glycol-water liquid absorbent solution, the following flow rates and other conditions relating to the system are required:

Number of conventional vapor-liquid
contact trays in the absorber 12         10
Concentration of lean triethylene

| | |
|---|---|
| glycol liquid absorbent | 99.7% TEG |
| Liquid absorbent circulation rate required | 657 gallons per hour |
| Stripping gas circulation rate required | 657 standard cubic feet per hour |
| Stripping gas consumption | 0 |

In order to dehydrate the same natural gas stream to the same outlet water dew point condition in a system including a 10-tray absorber and a conventional liquid absorbent reconcentrating apparatus, e.g., the system described and claimed in U.S. Pat. No. 3,105,748, the triethylene glycol liquid absorbent concentration and circulation rate required are the same as above, but a stripping gas consumption of 657 standard cubic feet per hour is incurred and a like amount of spent stripping gas is vented to the atmosphere or otherwise disposed of.

In order to dehydrate the same natural gas stream to the same outlet water dew point condition in a system including a 10-tray absorber and a conventional liquid absorbent reconcentrating apparatus wherein the liquid absorbent is reconcentrated by heat alone (no stripping gas used), a triethylene glycol liquid absorbent concentration of only 99.1% TEG is achieved and consequently, a circulation rate of liquid absorbent of 1752 gallons per hour is required.

The present invention, therefore, is well adapted to carry out the objects and attain the ends and advantages mentioned as well as those inherent therein. While presently preferred embodiments of the invention have been described herein for the purpose of disclosure, numerous changes in the details and arrangement of parts and steps of the invention can be made which will readily suggest themselves to those skilled in the art, and which are encompassed within the spirit of the invention disclosed herein.

What is claimed is:

1. A method of reconcentrating a stream of solute-rich liquid absorbent which comprises:
   a. heating the stream of rich liquid absorbent to vaporize a portion of the solute contained therein;
   b. separating the vaporized solute from the liquid absorbent;
   c. intimately contacting the resultant stream of partially reconcentrated liquid absorbent with a stream of stripping gas so that additional solute is vaporized and stripped therefrom to further reconcentrate the liquid absorbent;
   d. separating the resulting mixture of stripping gas and vaporized solute from the reconcentrated liquid absorbent;
   e. withdrawing the resulting stream of reconcentrated liquid absorbent;
   f. intimately contacting said mixture of stripping gas and solute with a stream of lean liquid absorbent so that at least a portion of the solute is removed therefrom;
   g. separating the resulting rich liquid absorbent from said stream of stripping gas and solute; and
   h. recycling said stream of stripping gas and solute into intimate contact with the partially reconcentrated liquid absorbent of step (c).

2. The method of claim 1 wherein the stream of lean liquid absorbent utilized for contacting the mixture of stripping gas and solute is a portion of the withdrawn stream of reconcentrated liquid absorbent of step (e).

3. The method of claim 1 which is further characterized to include the step of combining the rich liquid absorbent formed as a result of the initimate contact between said mixture of stripping gas and solute and said stream of lean liquid absorbent with the stream of solute-rich liquid absorbent prior to heating said stream of solute-rich liquid absorbent in accordance with step (a).

4. The method of claim 3 which is further characterized to include the step of passing said stream of solute-rich liquid absorbent in heat exchange relationship with said withdrawn stream of reconcentrated liquid absorbent prior to heating said stream of solute-rich liquid absorbent in accordance with step (a).

5. The method of claim 4 wherein said stream of solute-rich liquid absorbent is a stream of an aqueous glycol solution.

6. A method of reconcentrating a stream of water-rich liquid absorbent which comprises:
   a. heating said stream of rich liquid absorbent to vaporize a portion of the water contained therein;
   b. separating said vaporized water from said liquid absorbent;
   c. intimately contacting the resulting stream of partially reconcentrated liquid absorbent with a stream of relatively dry stripping gas so that additional water is vaporized and stripped therefrom to further reconcentrate said liquid absorbent;
   d. separating the resulting mixture of stripping gas and water from said stream of reconcentrated liquid absorbent;
   e. withdrawing said stream of reconcentrated liquid absorbent;
   f. cooling said mixture of stripping gas and water;
   g. intimately contacting said cooled mixture of stripping gas and water with a stream of lean liquid absorbent so that at least a portion of the water is removed therefrom;
   h. separating the resulting rich liquid absorbent from the resulting stream of relatively dry stripping gas; and
   i. recycling said stream of relatively dry stripping gas into intimate contact with the partially reconcentrated liquid absorbent of step (c).

7. The method of claim 6 wherein the stream of lean liquid absorbent utilized to contact the cooled mixture of stripping gas and water is a portion of the withdrawn stream of reconcentrated liquid absorbent of step (e).

8. The method of claim 6 which is further characterized to include the step of combining the rich liquid absorbent formed as a result of the intimate contact between said mixture of stripping gas and water and said stream of lean liquid absorbent with the stream of water-rich liquid absorbent prior to heating said stream of water-rich liquid absorbent in accordance with step (a).

9. The method of claim 8 which is further characterized to include the step of passing said stream of water-rich liquid absorbent in heat exchange relationship with said withdrawn stream of reconcentrated liquid absorbent prior of heating said stream of water-rich liquid absorbent in accordance with step (a).

10. The method of claim 9 wherein the liquid absorbent is triethylene glycol.

11. The method of claim 10 wherein the stripping gas is natural gas.

12. A system for reconcentrating a stream of solute-rich liquid absorbent comprising:

a heated reboiler to vaporize a portion of said solute and partially reconcentrate the liquid absorbent, said reboiler having a rich liquid absorbent inlet connection, a stripping gas and solute vapor outlet connection and a liquid absorbent outlet connection;

a stripping gas column for intimately contacting partially reconcentrated liquid absorbent with stripping gas to vaporize a portion of the solute contained therein and further reconcentrate the liquid absorbent, said stripping gas column including a liquid absorbent inlet connected to the liquid absorbent outlet connection of said reboiler, a stripping gas inlet connection and a reconcentrated liquid absorbent outlet connection;

contactor means for bringing about intimate contact between a stream of stripping gas and solute and a stream of lean liquid absorbent, said contactor means including a stripping gas and solute vapor inlet connection, a lean liquid absorbent inlet and a stripping gas and rich liquid absorbent outlet connection;

conduit means connected between the stripping gas and solute vapor outlet connection of said reboiler and the stripping gas and contactor means;

separator means for bringing about the separation of a stream of stripping gas from a stream of rich liquid absorbent, said separator means having a stripping gas and rich liquid absorbent inlet connection, a stripping gas outlet connection and a rich liquid absorbent outlet connection;

conduit means connected between the stripping gas and rich liquid absorbent outlet of said contactor means and the stripping gas and rich liquid absorbent inlet of said separator means; and conduit means connected between the stripping gas outlet connection of said separator means and the stripping gas inlet connection of said stripping gas column for recycling stream of stripping gas to said stripping gas column.

13. The system of claim 12 wherein the contactor means is a pump powered by the pressure energy of said stream of lean liquid absorbent which simultaneously pumps said stream of stripping gas and solute while bringing about intimate contact thereof with said stream of liquid absorbent.

14. The system of claim 12 which is further characterized to include conduit means connected between the rich liquid absorbent outlet connection of said separator means and the rich liquid absorbent inlet connection of said heated reboiler.

15. The system of claim 14 which is further characterized to include:

a reconcentrated liquid absorbent accumulator having an inlet connection and an outlet connection; and connection means between the reconcentrated liquid absorbent outlet connection of said stripping gas column and said accumulator inlet connection.

16. The system of claim 15 which is further characterized to include:

a heat exchanger for exchanging heat between reconcentrated liquid absorbent in said accumulator and the stream of solute-rich liquid absorbent, said heat exchanger being disposed within said accumulator and having an inlet connection for receiving the stream of solute-rich liquid absorbent to be reconcentrated and an outlet connection; and conduit means connected between said heat exchanger outlet connection and said heated reboiler solute-rich liquid absorbent inlet connection.

17. The system of claim 16 which is further characterized to include:

means for pumping the stream of reconcentrated liquid absorbent; and conduit means connected between the outlet connection of said accumulator and said pumping means.

18. The system of claim 17 which is further characterized to include conduit means connected between the discharge of said pumping means and the lean liquid absorbent inlet connection of said contactor means.

* * * * *